United States Patent
Gelder

[15] 3,686,482
[45] Aug. 22, 1972

[54] ARRANGEMENT FOR REGISTERING THE PRESENCE AND THE AVAILABILITY OF PERSONNEL

[72] Inventor: Franz Gelder, Gabelsberger Str. 36, Salzburg, Austria

[22] Filed: Sept. 15, 1970

[21] Appl. No.: 72,471

[30] Foreign Application Priority Data

Sept. 15, 1969 Austria..................8734/69

[52] U.S. Cl. .........235/92 EA, 235/92 R, 235/92 ST, 235/144 ET, 340/324, 346/80
[51] Int. Cl...............................................G06m 1/22
[58] Field of Search.......235/92 AC, 92 EA, 144 ET; 346/80, 81, 86; 340/324, 153, 339

[56] References Cited

UNITED STATES PATENTS 2,254,643  9/1941  Clehm........................340/324
2,971,811  2/1961  Findlay........................346/86

Primary Examiner—Maynard R. Wilbur
Assistant Examiner—Robert F. Gnuse
Attorney—Edwin E. Greigg

[57] ABSTRACT

A pair of indicator boards are provided for registering the presence and availability of employees for different types of work, the first board having signs identifying individual employees arranged in fields according to work category. The second board has a matrix arrangement of lamps with one line for each employee and one column for each work location and is actuated to display the availability of employees as substitutes at different locations.

16 Claims, 1 Drawing Figure

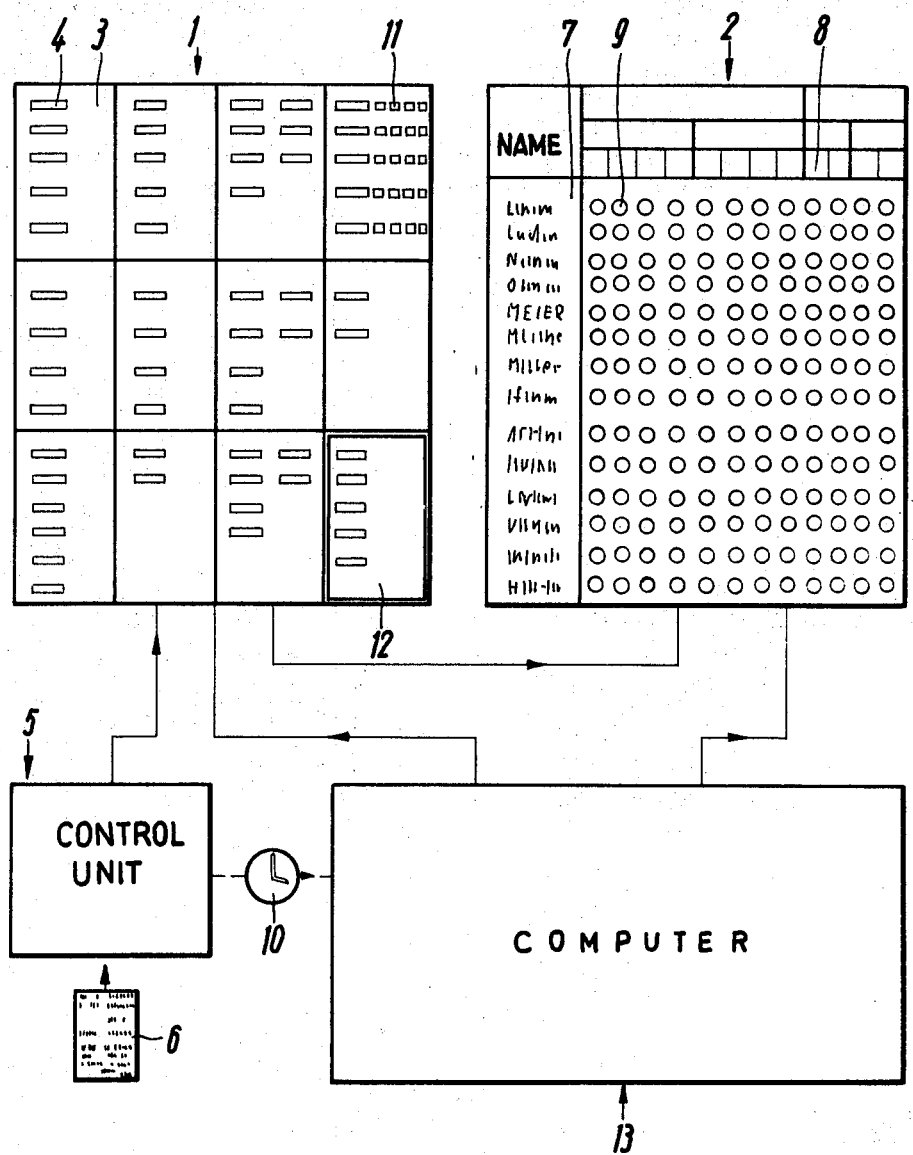

ARRANGEMENT FOR REGISTERING THE PRESENCE AND THE AVAILABILITY OF PERSONNEL

FIELD OF THE INVENTION

The invention relates to an arrangement for registering the presence or absence of employees and their availability as replacements at different locations of an enterprise, such as a plant, an office or the like.

BACKGROUND OF THE INVENTION

In modern enterprises it is imperative to assign the individual employees optimally to their tasks and also to control their presence and absence from work. It is also necessary to be able to ascertain at a glance at what locations an employee could be assigned as a replacement if this should be necessary for some reason such as sickness, accident, machine failure or the like. At the present time, these problems are solved, for instance, with the aid of time clocks showing the time an employee spends at his place of work and with indicator boards, on which the assignability of each employee is indicated by means of relays and/or colored magnets.

OBJECT AND SUMMARY OF THE INVENTION

It is an object of the invention to solve the above problems by means of a simplified registering arrangement which indicates, e.g., by means of a computer, not only the momentary presence or absence of each employee as well as the positions at which he could be used in emergency situations or as a replacement, but also the time spent at different positions, and to store this information to make it available for calculation of salary, which may also be performed with the aid of a computer.

According to the invention, there is provided an indicator board having fields, each of which represents a type or category of work occurring within the enterprise in question, which may be a manufacturing plant or an office or any other type of work place, and a number of optical display units for displaying individual symbols representing the employees doing work of the corresponding category, the arrangement further comprising a second indicator board having optical display units arranged in a matrix pattern for producing signals indicating the availability of individual employees at various work locations, a symbol representing an employee being coordinated in the matrix with a line (or a column) and a symbol designating a work location being coordinated with each column (or line) respectively, the display units of the first board being electrically connected with those of the second board and being operatively connected and selectively responsive to a control unit for registration of the presence and absence of individual employees at a work location.

The term "work location" is to be taken in its broadest sense as comprising any category of personnel whose works are related to each other, such as a place of work, a plurality of such places cooperating for some particular purpose, a bonus category, an accounting unit or the like.

BRIEF DESCRIPTION OF THE DRAWING

The invention will be described in more detail with reference to the drawing, which shows an embodiment thereof in diagrammatic form.

DESCRIPTION OF EMBODIMENT

The arrangement comprises a first indicator board 1 having a number of fields 3, in which are provided primary optical display units 4 for displaying individual symbols representing employees of the enterprise. The units may be name plates with means for illuminating them so as to display the employee's name, or digital countertubes for displaying an identifying serial number. The fields 3 may correspond to different fields or types of operation of the enterprise, such as different machines, shops, offices or units of any type or categories of employees performing related tasks, and so on.

A second indicator board 2 comprises display units in a matrix arrangement for displaying optical signals. The lines and columns of the matrix are coordinated with the symbols of the employees and with symbols designating work locations, respectively. The display units of the boards are electrically connected with each other. Connected to the fields of the first indicator board are corresponding control units 5, which may be provided in the vicinity of the corresponding locations. It is also possible to provide a single control unit, which can be selectively connected to the different fields 3. These control units are actuated in dependence upon the presence and the absence of the employees. For instance, the unit may be actuated by light barrier relays, or by an employee introducing into it a punched identification card or pressing an individual button. Provided between the control units and a computer 13 may be further signal-handling equipment, such as clocks, data storage devices or data transmission lines (connecting with a computer at a remote location, for instance), whereby the computer can measure the time spent by each employee at work locations. This time may be displayed on the corresponding fields by means of counters 11. If the employees are symbolized by digital countertubes, a separate field 12 may be provided for registering the absent or present employees, for instance, in numerical arrangement. For instance, computer 13 may include a storage device for each employee, to which is fed the number of hours the employee has spent at his work. The total number of hours is then accumulated at a corresponding address, which may also contain the number of hours multiplied by a factor representing hourly pay rate for the employee in question so as to indicate the salary due.

A second indicator board 2 is provided with display units linearly arranged in matrix form. The display units may be of various known types, such as small lamps or rotatable discs of the type known in telephone circuits. Computer 13 has stored therein the qualities and capacities of the employees for various types of work and controls the indicator board in such a manner as to cause it to represent adjacent to the symbol identifying the employee, such as his name or serial number, his availability for different categories of work. If, for instance, a person is capable of performing three types of work, the corresponding three lamps are lighted. Specifically, the intensity of the lamps may be variable so as to indicate additionally the person's presence or absence, for instance, the corresponding lamp may shine at full intensity when the person is present, and the others only at half or vice versa. Also, it is possible to use for this purpose lamps of different colors, or automatically controlled shutters, or differently colored windows could be place in front of the lamps.

Before an employee reaches his place of work, he passes by a control unit 5, which may be placed at the entrance of an office. He introduces in the device his punch card 6 carrying an identifying mark which is scanned by the control device. In the field 3 corresponding to the office in question, his name or symbol 4 on board 1 then lights up and at the same time the lamp 9 of the office corresponding to his name or symbol 7 on board 2 lights up at full intensity. Time clock 10 sends a signal to the computer, which stores the punch-in time and starts the corresponding counter 11.

If the activities of the person are carried out in different departments, his name or symbol is provided in the fields 3 corresponding to these departments. This measure is unnecessary if the indication takes place by means of digital countertubes, which are then fed by the computer according to the location of the person in question. In this case, it is also very simple to provide an additional field 12 for registering absent persons. If the control device is not operated by a person because of his absence, the computer controls the first indicator board 1 so as to cause the serial number of the person in question to remain dark and to be presented instead in field 12. On the second board 2, the corresponding lamp is not lighted. It would also be possible to cause it to flash.

The absence of a person is thus represented in two ways.

It is also possible to provide a counter for indicating the number of persons absent and present.

If it appears necessary to replace a certain person with another, the selection of the replacement is made by examining the column corresponding to the vacant post. Lamps which are lighted in this column indicate the persons that could be used for the purpose. The selection of the replacement can be left to the computer, which may select the suitable or easiest dispensable person on the basis of information fed to the computer and indicate the name or symbol on one of the boards. Also, if a certain production unit stops, for instance, owing to machine failure, the employee of that unit operates the control device so as to start the same process, or this process is initiated from a central unit to which reports are made.

The arrangement shown therefore makes it possible to register all employees and to show both their time and at what location they are and to represent their performance and their availability as replacements rapidly, clearly, and without loss of time, thus avoiding the errors resulting from these sources. The storage capacity of the computer also makes possible automatic salary computation or the computation of premiums or rates on the basis of permanently available data.

What is claimed is:

1. Arrangement for registering the presence and availability of the personnel of an enterprise, comprising:

a first indicator board having a plurality of fields thereon, each field corresponding to a category of work within said enterprise, primary optical display units in said fields for displaying individual symbols representing employees of said enterprise, a second indicator board having secondary optical display units in a matrix arrangement thereon for displaying optical signals indicating the availability of individual employees at different work locations, the units of the linear arrays of one direction being coordinated with symbols designating individual employees and the units of the linear arrays perpendicular to said direction being coordinated with symbols designating individual work locations, control unit means for scanning an employee identification card having a unique employee identification mark and establishing electrical connections between said control unit and said primary display units and secondary display units, means for establishing electrical connections from said primary to said secondary display units, said primary and said secondary display units being operatively connected and selectively responsive to a control unit for automatic registration of the presence and absence of individual employees at a work location in accordance with the mark information contained on the employee identification card.

2. Arrangement according to claim 1, in which the control unit means includes a control unit for each category of work, each control unit being connected to a corresponding field.

3. Arrangement according to claim 1, in which the control unit means includes at least one control unit coupled via selective switching means for connection to any one of a plurality of said fields.

4. Arrangement according to claim 1, in which said primary optical display units comprise name plates with means for illumination thereof.

5. Arrangement according to claim 1, in which said primary optical display units comprise digital countertubes.

6. Arrangement according to claim 1, in which said secondary optical display units comprise incandescent lamps.

7. Arrangement according to claim 6, in which the employee-designating symbols of said second indicator board are automatically controllable by said control means for optically indicating the presence and absence of the corresponding employees.

8. Arrangement according to claim 7, in which said employee-designating symbols have controllable light intensities.

9. Arrangement according to claim 7, in which said symbols have controllable colors.

10. Arrangement according to claim 1, in which said means for establishing electrical connections comprise computer means for automatically controlling said secondary display units.

11. Arrangement according to claim 10, further including clock means connected between said unit means and said computer, said clock means being responsive to said control unit means to provide information to said computer means for computing the times spent by an employee at different work locations.

12. Arrangement according to claim 11, wherein each field includes counters for displaying the time spent by each employee at a work location.

13. Arrangement according to claim 1, in which said first indicator board comprises an additional field having optical display units for indicating the absence of individual employees.

14. Arrangement for registering the presence and availability of the personnel of an enterprise, comprising:
- a first indicator board having a plurality of fields thereon, each field corresponding to a category of work within said enterprise,
- primary optical display units in said fields for displaying individual symbols representing employees of said enterprise,
- a second indicator board having secondary optical display units in a matrix arrangement thereon for displaying optical signals indicating the availability of individual employees at different work locations, the units of the linear arrays of one direction being coordinated with symbols designating individual employees and the units of the linear arrays perpendicular to said direction being coordinated with symbols designating individual work locations,
- control unit means for scanning an employee identification card each having a unique employee identification mark, means for electrically connecting said control unit means to said optical display units,
- computer means for establishing electrical connections between said primary and said secondary display units and said control unit means,
- said primary and said secondary displays units being operatively connected and selectively responsive to said control unit means for automatic registration of the presence and absence of individual employees at a work location in response to scanning of the employee identification card and
- signal handling means connected between said computer means and said control unit means for measuring the time spent by each employee at a work location.

15. Arrangement according to claim 14, wherein each field includes a counter for displaying the time spent by each employee at a work location.

16. Arrangement according to claim 14, wherein the units coordinated with individual employees include means responsive to information stored within the computer to indicate adjacent the symbol designating an individual employee, the capability of that employee for performing selected categories of work.

* * * * *